June 28, 1938.　　C. W. PROCHASKA　　2,121,980
MEASURING APPARATUS
Filed July 29, 1936
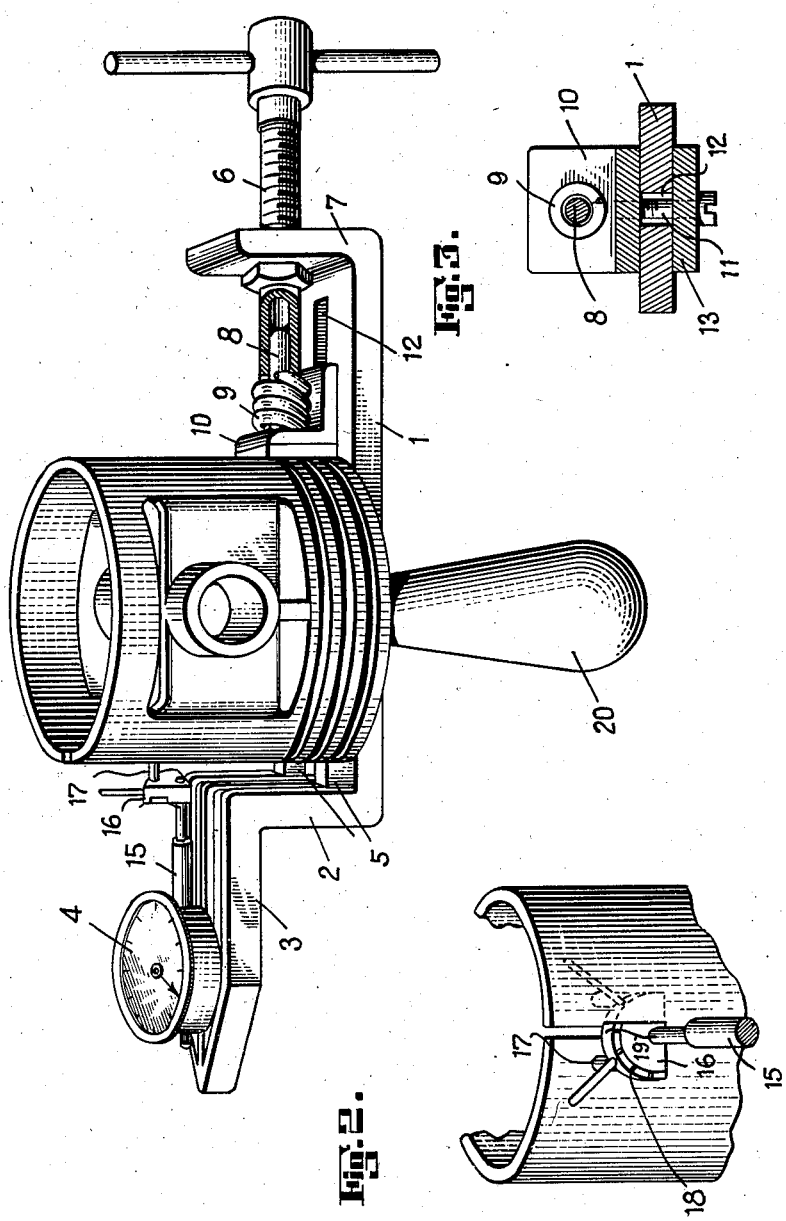

Patented June 28, 1938

2,121,980

UNITED STATES PATENT OFFICE 2,121,980

MEASURING APPARATUS

Carroll W. Prochaska, Mount Vernon, N. Y.

Application July 29, 1936, Serial No. 93,128

2 Claims. (Cl. 33—174)

This invention relates to measuring apparatus and particularly to apparatus adapted to measure the expansion of the skirt of a piston when reforming stresses are applied thereto.

Several processes are now available for reforming worn pistons to correct "piston slap", and the success of such processes is dependent to some extent on the ability to control accurately the extent of the reformation. It is an object of the present invention to provide a measuring apparatus which may be secured to the piston, and which will provide an accurate indication of the extent of the reformation thereof as the work of reforming proceeds, thus permitting constant control to be had.

Other objects and advantages of the invention will appear hereinafter.

A preferred embodiment of the invention selected for purposes of illustration is shown in the accompanying drawing, in which, Figure 1 is a perspective view showing the apparatus secured to a piston.

Figure 2 is a perspective view showing the oscillating plunger.

Figure 3 is a section through the clamp.

Referring to the drawing, the apparatus comprises a frame 1 adapted to receive the piston to be reformed, said frame having an upstanding portion 2 extending upwardly parallel to the wall of the piston for a portion of its height. Extending outwardly from the portion 2 is a portion 3 on which is firmly secured the gauge 4.

The frame is provided with a pair of lugs 5 against which the piston may seat, and the piston is held thereagainst by means of a clamp arranged at the opposite end of the frame. The said clamp comprises a threaded shaft 6 mounted in the vertical flange 7 of the frame, which said shaft carries a plunger 8 supporting a coil spring 9 located between the end of the shaft and the presser foot 10 which engages the base of the piston. The presser foot is provided with a guide pin 11 which passes through the slot 12 and is held in place by washer 13.

The gauge 4 may be of any suitable type, and is so mounted on the portion 3 that the reciprocating plunger 15 extends toward the wall of the piston. In reforming pistons having slotted skirts such as illustrated herein, it is important to control the extent of the reformation on both sides of the slot. Accordingly, the plunger 15 is preferably provided with a segment 16 mounted for oscillation thereon, and having a stud 17 adapted to engage the piston wall. This segment may be moved, as illustrated in Figure 2, to cause the stud 17 to engage the piston wall on either side of the slot so that an accurate measurement of either side may be had without readjusting the piston with respect to the frame. If desired, the segment 16 may be provided with notches 18 for cooperation with a spring 19 to hold the segment in any desired position of adjustment.

In operation, the piston to be reformed is placed on the frame in the manner illustrated in Figure 1 and the shaft 6 is turned to move the presser foot 10 into engagement with the head of the piston and to compress the spring 9 so that the piston is held by the pressure of the spring. This is of particular advantage where the piston is heated prior to reforming, for as the piston contracts as it cools, the spring takes up the slack, and the opposite side of the piston maintains its position relative to the gauge at all times. Thus, any given reading of the gauge when the hot piston is inserted will remain unchanged as the piston cools and contracts, and any change in the gauge reading will reflect accurately the extent of the reforming operation.

The frame may be provided with a handle 20 so that the piston and gauge may be handled as a unit during the reforming operation, and gauge readings may be had continuously as reforming proceeds.

It will be understood that the invention may be variously modified and embodied within the scope of the subjoined claims.

I claim as my invention:

1. Apparatus for measuring the expansion of a piston skirt, comprising a frame, a pair of lugs providing a seat for the piston head, means to apply resilient pressure to the piston head to hold it against the seat, and a gauge on said frame engaging the piston skirt at a point above said lugs.

2. Apparatus for measuring the expansion of a piston skirt, comprising a frame, a pair of lugs providing a seat for the piston head, means to apply resilient pressure to the piston head to hold it against the seat, and a gauge on said frame, said gauge having a reciprocating plunger provided with an oscillating member adapted to engage the piston skirt in a plurality of positions above said lugs.

CARROLL W. PROCHASKA.